United States Patent Office 3,026,317
Patented Mar. 20, 1962

3,026,317
[3,2-c]-PYRIMIDINE DERIVATIVES OF ANDROSTANE COMPOUNDS
Howard J. Ringold, John A. Zderic, Carl Djerassi, and Albert Bowers, Mexico City, Mexico, assignors to Syntex S.A., Mexico City, Mexico, a corporation of Mexico
No Drawing. Filed May 19, 1960, Ser. No. 30,062
Claims priority, application Mexico Aug. 13, 1959
26 Claims. (Cl. 260—239.5)

The present invention relates to novel cyclopentanophenanthrene compounds and process of preparing same.

More particularly the invention relates to novel pyrimidine-steroid compounds and more specifically to novel derivatives of the androstane series in which a pyrimidinyl nucleus is fused to the steroid nucleus. The androstane nucleus may contain an aliphatic hydrocarbon group at C–17α, a methyl group at C–4 or at C–6. The androstane nucleus may also contain unsaturation at C–4,5 and/or at C–6,7, in which case a methyl, fluorine or chlorine moiety may be present at C–4 and C–6.

The novel compounds of the present invention are hormones of the androgenic type having favorable anabolic, anti-estrogenic and anti-gonadotrophic activity and are illustrated by the following formulas:

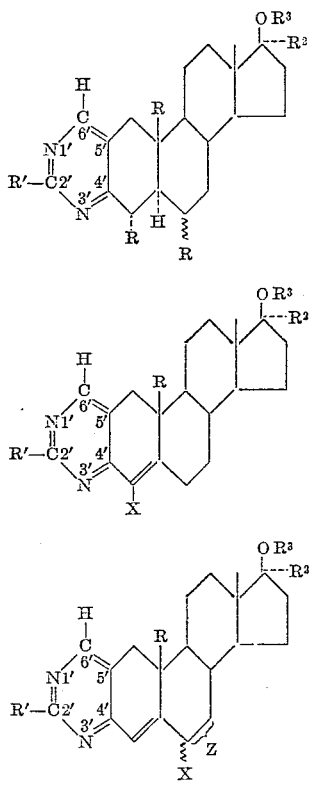

In the above formulas, Z indicates a double bond or a saturated linkage between C–6 and C–7; X represents hydrogen, methyl, fluorine or chlorine; R represents hydrogen or methyl; R' represents an aromatic group such as phenyl, pyridyl, naphthyl and the like containing from 6 to 12 carbon atoms which may or may not contain functional groups such as hydroxyl, halo, amino or nitro; $R^2$ represents hydrogen, alkyl, alkenyl or alkinyl in which the hydrocarbon groups contain up to 9 carbon atoms and include such groups as methyl, ethyl, propyl, butyl, vinyl, propen(1)yl, ethinyl and butin(1)yl; $R^3$ represents hydrogen or the acyl residue of a hydrocarbon carboxylic acid having less than 12 carbon atoms, saturated or unsaturated, straight chain or branched chain aliphatic, cyclic, cyclic aliphatic, aromatic and may be substituted by functional groups such as hydroxyl, acyloxy of up to 8 carbon atoms, amino or halogen. Typical ester groups are the acetate, propionate, butyrate, hemisuccinate, enanthate, caproate, benzoate, trimethylacetate, phenoxyacetate, phenylpropionate, cyclopentylpropionate, aminoacetate and β-chloropropionate.

The following equation illustrates in part a process for the preparation of the novel compounds of the present invention:

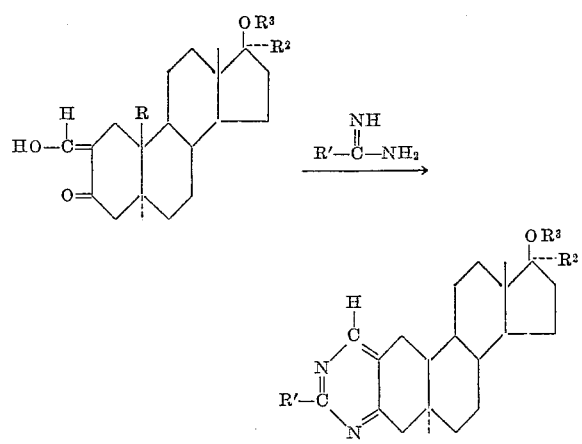

In the above formulas, R, R', $R^2$ and $R^3$ have the same meaning as heretofore set forth.

In practicing the process above outlined, a 2-hydroxymethylene dihydroallotestosterone or a 2-hydroxymethylene testosterone, as well as those of the 19-nor-series, which may also contain methyl or chlorine substitutents at C–4 or C–6 as previously described, and an aromatic amidine hydrochloride are condensed for 2 hours in an alkanol such as ethanol and in the presence of sufficient sodium methoxide to liberate the amidine. After concentration of the reaction mixture, followed by dilution with water, there is separated the novel heterocyclic compounds having a pyrimidine ring fused to carbon atoms C–2 and C–3 of the steroid.

Typical amidines suitable for the condensation are benzamidine, p-chlorobenzamidine, p-bromobenzamidine, o-nitrobenzamidine, m-nitrobenzamidine, p-nitrobenzamidine, phenyl acetamidine, p-hydroxyphenylacetamidine, p-methoxybenzamidine, α-naphthamidine, β-naphthamidine and tributylacetamidine.

The C–17β esters of the pyrimidine-steroidal compounds having no hydrocarbon substituent at C–17α are formed by reacting the alcohol with a carboxylic acid anhydride containing up to 12 carbon atoms in pyridine solution at room temperature whereas the C–17β esters of C–17α-substituted pyrimidine-steroidal compounds are produced by starting with C–17α substituted androstane compounds esterified at C–17β prior to the condensation with pyrimidine.

The following specific examples serve to illustrate but are not intended to limit the scope of the invention:

*Example I*

A solution of 5 g. of 2-hydroxymethylene-dihydroallotestosterone in 250 cc. of absolute ethanol was treated with 5 g. of benzamidine hydrochloride and sufficient amount of sodium ethoxide to liberate the amidine and the mixture was refluxed for 2 hours. It was then concentrated under reduced pressure to about 20 cc., diluted with ice water and the precipitate was collected by filtration, washed with water and recrystallized from acetone. There was thus obtained 17β-hydroxy-androstane-2'-phenyl-[3,2–c]-pyrimidine.

A solution of 1 g. of the above compound in 5 cc. of pyridine was treated with 3 g. of cyclopentylpropionic anhydride and kept overnight at room temperature. The mixture was poured into water, heated for 1 hour on the steam bath, cooled and the precipitate formed was collected, washed with water, dried and chromatographed on silica gel. There was thus obtained 17β-cyclopentyl-propionoxy-androstane-2'-phenyl-[3,2-c]-pyrimidine.

*Example II*

By an analogous method to that described in Example I, by reaction with m-nitrobenzamidine hydrochloride and sodium ethoxide, 2-hydroxymethylene-17α-methyl-dihydroallotestosterone was converted into 17α-methyl-17β-hydroxyandrostane-2'-m-nitrophenyl-[3,2-c]-pyrimidine.

*Example III*

By an analogous method to that of Example I, 2-hydroxymethylene-17α-methyl-19-nor-testosterone was converted by reaction with benzamidine hydrochloride and sodium ethoxide into 17α-methyl-17β-hydroxy-19-nor-$\Delta^4$-androstene-2'-phenyl-[3,2-c]-pyrimidine.

*Example IV*

In the method of the preceding example, there was substituted the 2-hydroxymethylene-17α-methyl-19-nor-testosterone by its 17-acetate thus producing 17α-methyl-17β - acetoxy - 19 - nor - $\Delta^4$ - androsten - 2' - phenyl-[3,2-c]-pyrimidine.

*Example V*

By an analogous method to that of Example I, there was condensed 2-hydroxymethylene-6-dehydrotestosterone with benzamidine hydrochloride in the presence of sodium ethoxide to produce 17β-hydroxy-$\Delta^{4,6}$-androstadiene-2'-phenyl-[3,2-c]-pyrimidine.

*Example VI*

By an analogous method to that described in Example I, there was condensed 2-hydroxymethylene-17α-methyl-4-chloro-testosterone described in our copending patent application Serial No. 773,829, now Pat. No. 2,966,501 with 2-nicotinamidine hydrochloride in the presence of sodium ethoxide, to give 17α-methyl-4-chloro-17β-hydroxy - $\Delta^4$ - androstene - 2' - (2 - pyridyl) - [3,2-c]-pyrimidine.

*Example VII*

By following the procedure described in Example I, 2-hydroxymethylene - 17α - vinyl - dihydroallotestosterone obtained by condensation of 17α-vinyl-dihydroallotestosterone with ethyl-formate, in accordance with the method described by H. J. Ringold et al. in J. Am. Chem. Soc. 81, 427 (1959) and in U.S. Patent 2,908,693, was treated with benzamidine hydrochloride, but using sodium methoxide instead of sodium ethoxide; there was thus finally obtained 17α-vinyl-17β-hydroxy-androstane-2'-phenyl-[3,2-c]-pyrimidine.

*Example VIII*

In accordance with the method described in Example I, 2-hydroxymethylene-6β,17α-dimethyl-dihydroallotestosterone was reacted with o-nitrobenzamidine hydrochloride in the presence of sodium ethoxide, to produce 6β,17α - dimethyl - 17β - hydroxy - androstane - 2' - o - nitrophenyl-[3,2-c]-pyrimidine.

The starting material, 2-hydroxymethylene-6β,17α-dimethyl-dihydroallotestosterone, was obtained from 6β,17α-dimethyl-androstan-17β-ol-3-one described in our copending patent application Serial No. 643,550, by treatment with ethyl formate in the presence of sodium hydride, as described by H. J. Ringold et al. in J. Am. Chem. Soc. 81, 427 (1959).

*Example IX*

By an analogous method to that described in Example I, there was condensed 2-hydroxymethylene-19-nor-testosterone with p-bromobenzamidine hydrochloride in the presence of sodium ethoxide, to produce 17β-hydroxy-19-nor - $\Delta^4$ - androstene - 2' - p - bromophenyl - [3,2 - c]-pyrimidine. Acetylation in a conventional manner gave the corresponding acetate.

*Example X*

By following the procedure described by H. J. Ringold et al. in J. Am. Chem. Soc. 81, 427 (1959), 4-chloro-testosterone and 4-methyl-testosterone were converted into the corresponding 2-hydroxymethylene derivatives which in turn were treated with benzamidine hydrochloride in ethanol solution and in the presence of sodium ethoxide, in accordance with the procedure of Example I, to produce the corresponding 2'-phenyl-[3,2-c]-pyrimidine derivatives, namely 4-chloro-17β-hydroxy-$\Delta^4$-androstene-2'-phenyl-[3,2-c]-pyrimidine and 4-methyl-17β-hydroxy-$\Delta^4$-androstene-2'-phenyl-[3,2-c]-pyrimidine.

*Example XI*

A solution of 1 g. of 4-chloro-17β-hydroxy-$\Delta^4$-androstene-2'-phenyl-[3,2-c]-pyrimidine in 5 cc. of pyridine was treated with 3 cc. of propionic anhydride, and the reaction mixture was kept at room temperature overnight. It was then poured into ice water and the formed precipitate collected. There was thus obtained the propionate of 4-chloro-17β-hydroxy-$\Delta^4$-androstene-2'-phenyl-[3,2-c]-pyrimidine.

*Example XII*

In accordance with the procedures of Examples I and VI, 2-hydroxymethylene-17α-ethinyl-dihydroallotestosterone, obtained from 17α-ethinyl-dihydroallotestosterone by following the method of H. J. Ringold et al. in J. Am. Chem. Soc. 81, 427 (1959), was converted, respectively, into 17α-ethinyl-17β-hydroxyandrostane-2'-phenyl-[3,2-c]-pyrimidine and 17α-ethinyl-17β-hydroxyandrostane-2'-(2-pyridyl)-[3,2-c]-pyrimidine.

*Example XIII*

1 g. of 4,17-dimethyl-testosterone described in U.S. Patent 2,844,602 was converted into its hydroxymethylene derivative by applying the condensation method described by H. J. Ringold et al. in J. Am. Chem. Soc. 81, 427 (1959). The above compound was treated with benzamidine hydrochloride, in accordance with the procedure of Example I, to produce 4,17α-dimethyl-$\Delta^4$-androstene-2'-phenyl-[3,2-c]-pyrimidine.

*Example XIV*

In accordance with the method described in Example I, 2-hydroxymethylene-6β-methyl-dihydroallotestosterone, disclosed by H. J. Ringold et al. in J. Am. Chem. Soc. 81, 427 (1959) was reacted with benzamidine hydrochloride to form 17β-hydroxy-6β-methyl-androstane-2'-phenyl-[3,2-c]-pyrimidine.

*Example XV*

By following the method described by Ringold et al. in U.S. Patent 2,908,693, 4α,17α-dimethyl-dihydroallotestosterone was converted into 2-hydroxymethylene-4α,17α-dimethyl-dihydroallotestosterone and then by the method described in Example I, by the reaction with o-nitrobenzamidine hydrochloride and sodium ethoxide was converted into 4α,17α-dimethyl-17β-hydroxyandrostane-2'-o-nitrophenyl-[3,2-c]-pyrimidine.

*Example XVI*

By following the method of H. J. Ringold et al. described in the aforementioned U.S. Patent 2,908,693, 6(α or β)-methyl-19-nor-dihydroallotestosterone, disclosed in copending application Serial No. 843,938, filed October 2, 1959, were converted into the 2-hydroxymethylene derivatives and by the procedure set forth in Example I, were transformed into the 6(α or β)-methyl-17β-hydroxy-19-nor-androstane-2'-phenyl-[3,2-c]-pyrimidines, by the reaction with benzamidine hydrochloride as set forth in Example I.

In accordance with the method described by H. J. Ringold et al. in J. Am. Chem. Soc. 81, 427 (1959) and in U.S. Patent 2,908,693, the 2-hydroxymethylene derivatives of the compounds listed under A were formed, which by the method described in Example I, were converted into the compounds listed under B.

| Example | A | B |
|---|---|---|
| XVII | 6α,17α - dimethyl- -testosterone. | 6α,17α - dimethyl - 17β - hydroxy - Δ⁴ - androstene - 2'-phenyl-[3,2-c]-pyrimidine. |
| XVIII | 6(α or β)-fluoro-testosterone. | 6(α or β)-fluoro-17β-hydroxy-Δ⁴-androstene - 2'-phenyl-[3,2-c]-pyrimidine. |
| XIX | 6,17α - dimethyl-6-dehydro-testosterone (disclosed in copending application Serial No. 826,119, filed July 10, 1959). | 6,17α - dimethyl - 17β - hydroxy - Δ⁴,⁶-androstadiene-2' - phenyl - [3,2-c]-pyrimidine. |
| XX | 6 - chloro - 17α - ethinyl - 19-nor - 6 - dehydro - testosterone (described in copending application Serial No. 856,010, filed Nov. 30, 1959). | 6 - chloro - 17α - ethinyl - 17β-hydroxy - 19 - nor - Δ⁴,⁶-androstadiene - 2'- phenyl-[3,2-c]-pyrimidine. |

*Example XXI*

By following the method of Example I, except that acetic anhydride was employed instead of cyclopentylpropionic anhydride, there was obtained the corresponding acetates of the compounds produced in Examples I, V, IX, X, XI, XIV, XVI, and XVIII.

In other experiments the esterification of the foregoing compounds was conducted with other hydrocarbon carboxylic acid anhydrides containing less than 12 carbon atoms to produce the corresponding 17-esters, including the propionates, butyrates, benzoates and enanthates.

We claim:
1. A compound of the following formula:

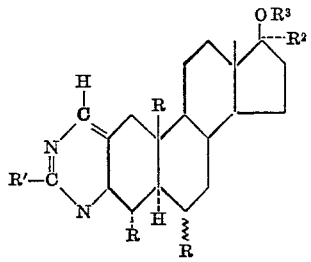

wherein R is selected from the group consisting of hydrogen and methyl and one of the R's at C-4 and C-6 is hydrogen when the other is methyl; R' is an aromatic radical containing from 6 to 12 carbon atoms; R² is selected from the group consisting of hydrogen, alkyl, alkenyl and alkinyl groups containing up to 9 carbon atoms; and R³ is selected from the group consisting of hydrogen and a hydrocarbon carboxylic acyl group containing less than 12 carbon atoms.

2. 17β-hydroxy-androstane - 2' - phenyl-[3,2-c]-pyrimidine.

3. 17β-cyclopentylpropionoxy-androstane - 2' - phenyl-[3,2-c]-pyrimidine.

4. 17α-methyl - 17β - hydroxy-androstane-2'-m-nitrophenyl-[3,2-c]-pyrimidine.

5. 17α - vinyl - 17β - hydroxy-androstane - 2' - phenyl-[3,2-c]-pyrimidine.

6. 6β,17α-dimethyl - 17β - hydroxy-androstane-2'-o-nitrophenyl-[3,2-c]-pyrimidine.

7. 17α-ethinyl-17β-hydroxy-androstane - 2' - phenyl-[3,2-c]-pyrimidine.

8. 17α-ethinyl - 17β - hydroxy-androstane - 2' - (2-pyridyl)-[3,2-c]-pyrimidine.

9. 4α,17α-dimethyl - 17β - hydroxy-androstane-2'-o-nitrophenyl-[3,2-c]-pyrimidine.

10. 6α-methyl-17β-hydroxy - 19 - nor-androstane-2'-phenyl-[3,2-c]-pyrimidine.

11. A compound of the following formula:

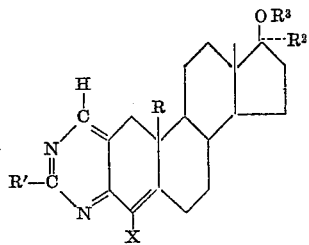

wherein R is selected from the group consisting of hydrogen and methyl; R' is an aromatic radical containing from 6 to 12 carbon atoms; R² is selected from the group consisting of hydrogen, alkyl, alkenyl and alkinyl groups containing up to 9 carbon atoms; R³ is selected from the group consisting of hydrogen and a hydrocarbon carboxylic acyl group containing less than 12 carbon atoms; and X is selected from the group consisting of hydrogen, methyl, fluorine and chlorine.

12. 17α-methyl-17β-hydroxy - 19 - nor-Δ⁴-androstene-2'-phenyl-[3,2-c]-pyrimidine.

13. 17α-methyl-17β-acetoxy - 19 - nor-Δ⁴-androstene-2'-phenyl-[3,2-c]-pyrimidine.

14. 17α-methyl-4-chloro - 17β - hydroxy-Δ⁴-androstene-2'-(2-pyridyl)-[3,2-c]-pyrimidine.

15. 17β-hydroxy-19-nor - Δ⁴ - androstene-2'-p-bromophenyl-[3,2-c]-pyrimidine.

16. 4-chloro-17β-hydroxy - Δ⁴ - androstene-2'-phenyl-[3,2-c]-pyrimidine.

17. 4-methyl-17β-hydroxy - Δ⁴ - androstene-2'-phenyl-[3,2-c]-pyrimidine.

18. 4-chloro-17β-propionoxy - Δ⁴ - androstene-2'-phenyl-[3,2-c]-pyrimidine.

19. 4,17α-dimethyl-Δ⁴-androstene - 2' - phenyl-[3,2-c]-pyrimidine.

20. A compound of the following formula:

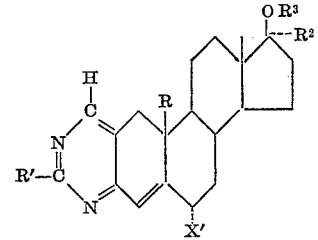

wherein R is selected from the group consisting of hydrogen and methyl; R' is an aromatic radical containing from 6 to 12 carbon atoms; R² is selected from the group consisting of hydrogen, alkyl, alkenyl and alkinyl groups containing up to 9 carbon atoms; R³ is selected from the group consisting of hydrogen and a hydrocarbon carboxylic acyl group containing less than 12 carbon atoms; and X' is selected from the group consisting of methyl, chlorine and fluorine.

21. 6α,17α - dimethyl - 17β - hydroxy - Δ⁴ - androstene-2' - phenyl - [3,2-c] - pyrimidine.

22. 6α - fluoro - 17β - hydroxy - Δ⁴ - androstene -2'-phenyl - [3,2-c] - pyrimidine.

23. A compound of the following formula:

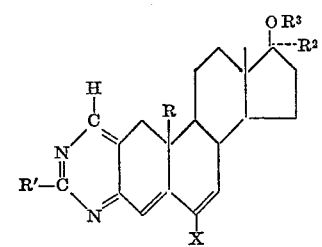

wherein R is selected from the group consisting of hydrogen and methyl; R' is an aromatic radical containing from 6 to 12 carbon atoms; $R^2$ is selected from the group consisting of hydrogen, alkyl, alkenyl and alkinyl groups containing up to 9 carbon atoms; $R^3$ is selected from the group consisting of hydrogen and a hydrocarbon carboxylic acyl group containing less than 12 carbon atoms; and X is selected from the group consisting of hydrogen, methyl, chlorine and fluorine.

24. 17β - hydroxy - $\Delta^{4,6}$ - androstadiene - 2' - phenyl-[3,2-c] - pyrimidine.

25. 6 - chloro - 17α - ethinyl - 17β - hydroxy - 19 - nor-$\Delta^{4,6}$ - androstadiene - 2' - phenyl - [3,2-c] - pyrimidine.

26. 6,17α - dimethyl - 17β - hydroxy - $\Delta^{4,6}$ - androstadiene - 2' - phenyl [3,2-c] - pyrimidine.

No references cited.